Nov. 29, 1955     J. F. MARTIN     2,725,129
HYDRAULICALLY OPERATED EMERGENCY BRAKE
Filed July 20, 1954

INVENTOR.
JOSEPH F. MARTIN
BY
Edward M. Apple
ATTY

United States Patent Office 2,725,129
Patented Nov. 29, 1955

2,725,129

HYDRAULICALLY OPERATED EMERGENCY BRAKE

Joseph F. Martin, Detroit, Mich.

Application July 20, 1954, Serial No. 444,443

3 Claims. (Cl. 192—4)

This invention relates to automotive devices, and has particular reference to a device for automatically engaging and releasing the emergency brake of a motor vehicle.

An object of the invention is to generally improve devices such as disclosed in Patent No. 2,656,025, issued to me on October 20, 1953, and devices such as disclosed in my co-pending application, Serial No. 444,442, filed July 20, 1954, of which this may be considered a continuation in part.

Another object of the invention is to provide an automatic hydraulic mechanism for engaging and disengaging the emergency brake, which mechanism may readily be installed on old or new motor vehicles such as are equipped with conventional emergency brake mechanisms, gear shift levers, or automatic transmissions.

Another object of the invention is to provide hydraulic means for engaging and disengaging the emergency brake simultaneously with the changing of the position of the transmission speed selector mechanism or the conventional gear shift lever position on the steering column.

Another object of the invention is to provide hydraulic power means for engaging and disengaging the emergency brake mechanism, which power means are controlled by the manual operation of selecting a pre-determined position on the automatic transmission mechanism without in any way interferring with the normal functioning of the automatic transmission.

The foregoing and other objects and advantages of the invention will become more apparent as the description proceeds, reference being made from time to time to the accompanying drawing forming part of the within disclosure, in which drawing.

Figure 1:
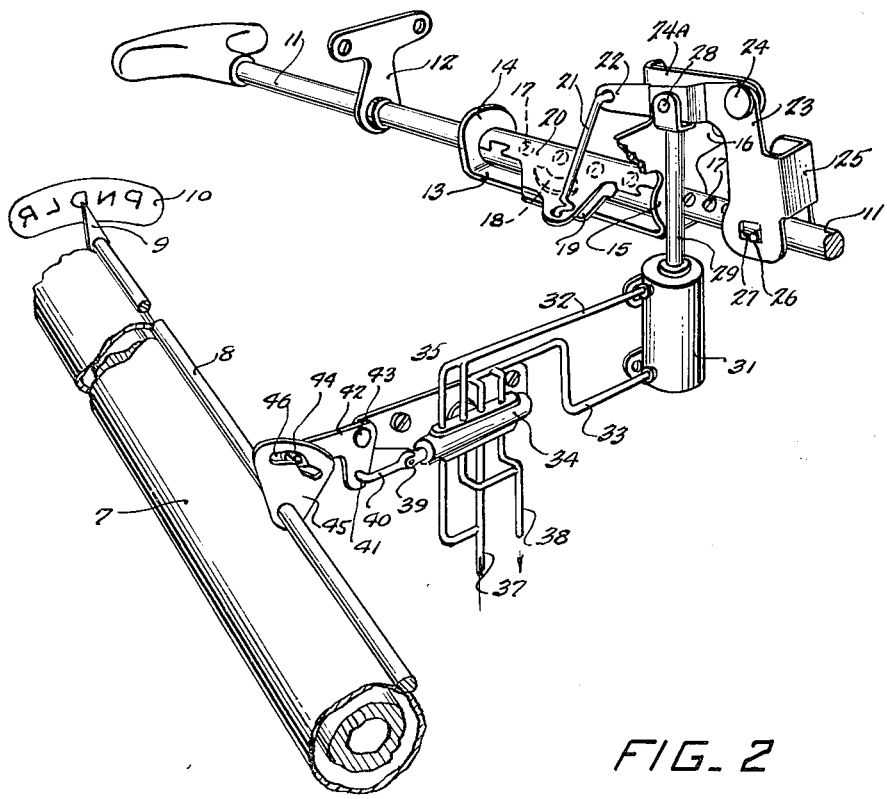
Fig. 1 is a perspective view of a mechanism embodying the invention and illustrating the hydraulic power elements in relation to the hand brake rod, the vehicle steering column and the speed selector mechanism of a vehicle having an automatic transmission.

Referring now more particularly to the drawing, it will be understood that in the embodiment herein disclosed, the reference character 7 indicates the steering column of a motor vehicle having an automatic transmission which is controlled by means of the speed selector rod 8, which is provided with an indicator 9 arranged to indicate on the speed selector panel 10 the gear changes and speeds within the range of the automatic transmission. The reference character 11 indicates the emergency brake hand rod which is connected to the emergency brake pull cable (not shown) and which is normally urged into released position by means of a spring (not shown) which comprise parts of the conventional emergency brake mechanism of the motor vehicle. The rod 11 is supported at the front by means of a bearing bracket 12 which is preferably secured to the rear of the instrument panel (not shown) of the motor vehicle and the rod 11 is supported at the rear by means of the cradle 13 having end bearing members 14 and 15. The cradle 13 has an extension member 16 whereby it is secured to the driver's side of the fire wall (not shown) of the vehicle body. Machined on the rod 11 is a plurality of ratchet teeth 17 which are arranged to be engaged by a locking pawl 18, which is spring backed and is pivoted in the pawl supporting member 19, which is formed integrally with the sleeve 20, which is arranged to rotate about the rod 11 and which is held against endwise movement on the rod 11 by means of the end bearing members 14 and 15. The pawl carrying member 19 is connected by means of a link 21 to the upper end 22 of a bell crank 23, which is pivoted, as at 24, to an extension 24A formed on the member 16. The bell crank 23 has a yoke portion 25 through which is extended the rod 11 and to which it is connected by means of a pin 26 which engages the slot 27 formed in the yoke portion 25.

The upper end 22 of the bell crank 23 is pivoted, as at 28, to the piston rod 29 of the hydraulic piston 30 (Fig. 2) which reciprocates in the hydraulic cylinder 31 which is preferably mounted on the motor side of the fire wall of the vehicle body. The hydraulic cylinder 31 is provided with hydraulic lines 32 and 33, which enter the cylinder 31 above and below the double acting piston 30 so that hydraulic power may be exerted on the piston 30 in either direction through the control valve 34, which is also secured by means of a bracket 35 to the engine side of the fire wall (not shown). The valve 34 has a plunger 36 which serves as the distributing head whereby the direction of flow through the lines 32 and 33 may be reversed. The lines 32 and 33 are connected through the lines 37 and 38 to a hydraulic pump (not shown).

The valve plunger 26 is pivoted, as at 39, to a push-pull rod 40, which in turn is pivoted, as at 41, to a rocker arm 42 which is pivoted, as at 43, to the bracket 35. The outer end of the rocker arm 42 is connected, as at 44, to a cam plate 45 through a cam slot 46. The cam plate 45 is connected to the selector rod 8 and moves therewith.

Figure 2:
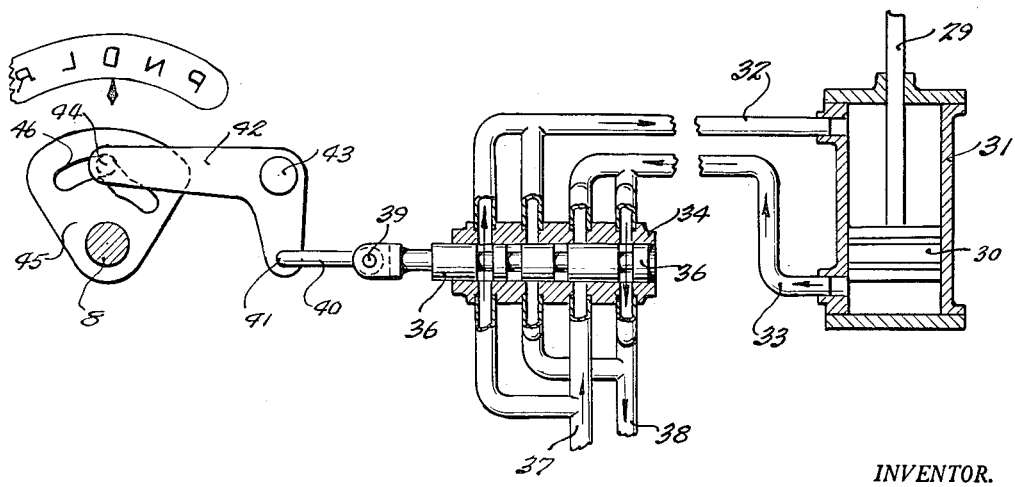
Fig. 2 is an enlarged fragmentary view, with parts in section, of the hydraulic power mechanism and associated parts illustrated in Fig. 1.

The device operates as follows:

When the selector rod pointer 9 indicates "D" for "Drive," the cam plate 45 and the members 42, 40 and 36 will be in the positions shown in Figs. 1 and 2 so that hydraulic pressure may enter the cylinder 31 above the piston 30, forcing the piston 30 and the piston rod 29 downwardly, at the same time downwardly rocking the end 22 of the bell crank 23. The downward rocking of the end 22 of the bell crank 23 forces the link 21 downwardly to rock the sleeve 20 and the pawl carrier 19 downwardly. The downward movement of the pawl carrier 19 moves the pawl 18 out of alignment with the ratchet teeth 17 so that the rod 11 is free to move to the right under the influence of the emergency brake release spring (not shown) and under the influence of the outward movement of the lower end of the rocker arm 23 through the slot 27 and pin 26. The valve 36 will remain in the same position when the pointer 9 is moved either to indicate "L" for "Low" or "R" for "Reverse" because of the lost motion between the cam plate 45 and the arm 42, as shown in Fig. 2.

When the pointer 9 is moved to "N" for "Neutral" or "P" for "Park," the slot in the cam plate 45 will rock the outer end of the arm 42 downwardly, causing the outward movement of the valve 36 which will reverse the flow of fluid throgh the lines 32 and 33, permitting hydraulic pressure to be exerted below the piston 30, forcing the piston to the top of the cylinder 31. The upward movement of the piston 30 carries with it the upward movement of the connecting rod 29 and the end 22 of the bell crank 23. The upward movement of the end 22 of the bell crank 23 pulls the linkage 21 upwardly, causing the pawl carrier 19 to rock upwardly, bringing the pawl 18 into alignment with the ratchet teeth 17 on the rod 11. After the pawl 18 is brought into alignment with the ratchet teeth 17, the lower end of the bell crank 23 continues to move inwardly causing the wall of the slot 27 to engage the pin 26 to move the rod 11 to the left and into the emergency brake setting position, where it will remain until the pawl 18 is again rocked out of locking position with the ratchet teeth 17 to permit the rod 11 to be returned to the brake release position previously described.

Having described my invention, what I claim and desire to secure by Letters Patent is:

1. In a motor vehicle having an emergency brake mechanism, including a push-pull rod having ratchet teeth thereon, and a speed selector mechanism, including a speed selector indicator and rod, the combination of a bracket for supporting said push-pull rod, a sleeve mounted for rotation on said push-pull rod, a spring backed pawl carried on an extension on said sleeve and alignable with said ratchet teeth, a bell crank, one arm of said bell crank having linkage connected to said sleeve and arranged to move said pawl into and out of alignment with said teeth, said arm of said bell crank also being pivoted to the piston rod of a hydraulic cylinder, a control valve for said hydraulic cylinder, and linkage from said control valve to the selector rod of said speed selector mechanism, the other arm of said bell crank being connected to said push-pull rod, there being a connection between said bell crank and said push-pull rod consisting of a pin extending through said push-pull rod and a slot in the arm of said bell crank, whereby to permit the movement of said sleeve by said bell crank before said bell crank moves said push-pull rod.

2. In a motor vehicle having an emergency brake mechanism, including a push-pull rod having ratchet teeth thereon, and a speed selector mechanism, including a speed selector indicator and rod, the combination of a bracket for supporting said push-pull rod, a sleeve mounted for rotation on said push-pull rod, a spring backed pawl carried on an extension on said sleeve and alignable with said ratchet teeth, a bell crank, one arm of said bell crank having linkage connected to said sleeve and arranged to move said pawl into and out of alignment with said teeth, said arm of said bell crank also being pivoted to the piston rod of a hydraulic cylinder, a control valve for said hydraulic cylinder, and linkage from said control valve to the selector rod of said speed selector mechanism, the other arm of said bell crank being connected to said push-pull rod, said linkage between said control valve and said selector rod including a slotted cam plate and a pin slidable in said slot.

3. In a motor vehicle having an emergency brake mechanism, including a push-pull rod having ratchet teeth thereon, and a speed selector mechanism, including a speed selector indicator and rod, the combination of a bracket for supporting said push-pull rod, a sleeve mounted for rotation on said push-pull rod, a spring backed pawl carried on an extension on said sleeve and alignable with said ratchet teeth, a bell crank, one arm of said bell crank having linkage connected to said sleeve and arranged to move said pawl into and out of alignment with said teeth, said arm of said bell crank also being pivoted to the piston rod of a hydraulic cylinder, a control valve for said hydraulic cylinder, and a linkage from said control valve to the selector rod of said speed selector mechanism, the other arm of said bell crank being connected to said push-pull rod, said hydraulic cylinder being double acting and said control valve is arranged to alternately introduce hydraulic pressure to one side and then the other of the piston in said cylinder.

References Cited in the file of this patent

UNITED STATES PATENTS

| | | |
|---|---|---|
| 2,059,069 | Weiss | Oct. 27, 1936 |
| 2,251,787 | Gardiner | Aug. 5, 1941 |